United States Patent [19]

Wittmann et al.

[11] Patent Number: 5,030,675

[45] Date of Patent: Jul. 9, 1991

[54] FLAME-RESISTANT THERMOPLASTIC MOULDING COMPOUNDS BASED ON POLYCARBONATE, POLYALKYLENE TEREPHTHALATE, GRAFT COPOLYMER, FLUORINATED POLYOLEFINE AND PHOSPHORUS COMPOUND

[75] Inventors: Dieter Wittmann, Krefeld, Fed. Rep. of Germany; Hans-Jürgen Kress, Pittsburgh, Pa.; Horst Peters, Leverkusen, Fed. Rep. of Germany; Josef Buekers, Krefeld, Fed. Rep. of Germany; Christian Lindner, Cologne, Fed. Rep. of Germany

[73] Assignee: Bayer Aktiengesellschaft, Leverkusen, Fed. Rep. of Germany

[21] Appl. No.: 453,053

[22] Filed: Dec. 13, 1989

Related U.S. Application Data

[63] Continuation of Ser. No. 233,022, Aug. 17, 1988, abandoned.

[30] Foreign Application Priority Data

Aug. 29, 1987 [DE] Fed. Rep. of Germany ....... 3728924

[51] Int. Cl.$^5$ ............................ C08K 5/51; C08K 5/52; C08K 5/524; C08K 5/53

[52] U.S. Cl. ..................................... 524/130; 524/132; 524/133; 524/135; 524/140; 524/141; 524/142; 524/144; 524/149; 524/151; 525/146; 525/147

[58] Field of Search ............. 524/130, 132, 133, 135, 524/140, 141, 142, 144, 149, 151; 525/146, 147

[56] References Cited

U.S. PATENT DOCUMENTS

| | | | |
|---|---|---|---|
| 3,787,528 | 1/1974 | Benghiat | 524/130 |
| 3,809,676 | 5/1974 | Liberti | 524/135 |
| 4,463,130 | 7/1984 | Serini et al. | 524/147 |
| 4,474,914 | 10/1984 | Spivack | 524/135 |
| 4,515,918 | 5/1985 | Nouvertné et al. | 524/504 |
| 4,554,314 | 11/1985 | Chung et al. | 524/504 |
| 4,564,654 | 1/1986 | Serini et al. | 524/147 |
| 4,638,033 | 1/1987 | Boutni et al. | 524/504 |
| 4,692,488 | 9/1987 | Kress et al. | 524/504 |
| 4,751,260 | 6/1988 | Kress et al. | 524/504 |

*Primary Examiner*—Kriellion S. Morgan
*Attorney, Agent, or Firm*—Connolly and Hutz

[57] ABSTRACT

Flame-resistant molding compounds of polycarbonate, polyalkylene terephthalate, graft polymer, fluorinated polyolefine and phosphorus compound can be worked up into moulded products which have a particularly advantageous combination of joint line strength, dimensional stability under heat and toughness.

10 Claims, No Drawings

FLAME-RESISTANT THERMOPLASTIC MOULDING COMPOUNDS BASED ON POLYCARBONATE, POLYALKYLENE TEREPHTHALATE, GRAFT COPOLYMER, FLUORINATED POLYOLEFINE AND PHOSPHORUS COMPOUND

This application is a continuation of application Ser. No. 233,022, filed 8/17/88, now abandoned.

This invention relates to thermoplastic moulding compounds of aromatic polycarbonate, polyalkylene terephthalate, graft polymer, fluorinated polyolefine and phosphorus compound, to a process for the preparation of these moulding compounds by mixing the components at an elevated temperature and to the use of the moulding compounds for the production of moulded articles, particularly by injection moulding.

Moulding compounds prepared from aromatic polycarbonate, polyalkylene terephthalate and rubbery elastic polymer are known (US-PS 3 864 428, EP-A 25 920, 64 648, 110 222, JP-A 59-166 556). They can be worked up into moulded products with high impact strength.

It has now surprisingly been found that moulding compounds prepared from aromatic polycarbonate, polyalkylene terephthalate and rubbery elastic polymer, fluorinated polyolefine and phosphorus compound have a particularly advantageous combination of flame resistance, joint seam strength, dimensional stability under heat and toughness.

This combination of properties is particularly important in complicated moulded articles which are required to be flame resistant, such as computer housings where constructionally determined breaks in the structure or webs or the like necessitate a high degree of basic toughness combined with a high joint seam strength and ability to withstand stressful temperature conditions.

This invention relates to thermoplastic moulding compounds composed of

A. from 45 to 95% by weight, preferably from 60 to 90% by weight of aromatic polycarbonate, B. from 5 to 55% by weight, preferably from 10 to 40% by weight of polyalkylene terephthalate, C. from 0.1 to 30% by weight, preferably from 0.1 to 12 and especially from 0.1 to 3% by weight of graft polymer, D. from 0.05 to 5% by weight, preferably from 0.1 to 1 and especially from 0.1 to 0.5% by weight of fluorinated polyolefine and E. from 1 to 20% by weight, preferably from 2 to 15% by weight of a phosphorus compound corresponding to the formula

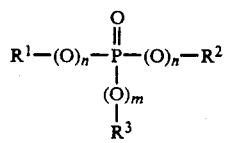

wherein $R^1$, $R^2$ and $R^3$ denote, independently of one another, optionally halogenated $C_1$-$C_8$-alkyl or optionally halogenated $C_6$-$C_{20}$-aryl, m stands for 0 or 1 and n stands for 0 or 1, the above percentages always referring to the sum of components A+B.

Moulding compounds obtained from aromatic polycarbonate, graft polymer, copolymer, fluorinated polyolefine, halogen compound and phosphorus compound have been disclosed in DE-OS 35 12 638. They are said to give rise to moulded articles of good surface quality and high flame resistance with a reduced tendency to drip in the event of fire, but the joint strength of these moulding compounds is not sufficient for certain applications. The solution to this problem provided by the present invention, namely of using polyalkylene terephthalate instead of the copolymer used according to DE-OS 35 12 638, has not been in any way suggested in this literature reference.

Aromatic polycarbonates A in the context of this invention are homopolycarbonates, copolycarbonates and mixtures of these polycarbonates based, for example, on at least one of the following diphenols:

Hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl).sulphoxides,
bis-(hydroxyphenyl)-sulphones and
α,α'-bis-(hydroxyphenyl)-diisopropylbenzenes, and derivatives thereof which are alkylated or halogenated in the nucleus. These and other suitable diphenols are described, for example, in US-PS 3 028 365, 3 275 601, 3 148 172, 3 062 781, 2 991 273, 3 271 367, 2 999 835, 2 970 131 and 2 999 846, in DE-OS 1 570 703, 2 063 050, 2 063 052, 2 211 956 and 2 211 957, in FR-PS 1 561 518 and in the monograph by H. Schnell, entitled "Chemistry and Physics of Polycarbonates", Interscience Publishers, New York, 1964.

The following are examples of preferred diphenols:
4,4'-Dihydroxydiphenyl,
2,4-bis-(4-hydroxyphenyl)-2-methylbutane,
α,α'-bis-(4-hydroxyphenyl)-p-diisopropylbenzene,
2,2-bis-(3-methyl-4-hydroxyphenyl)-propane and
2,2-bis-(3-chloro-4-hydroxyphenyl)-propane.

The following are examples of particularly preferred phenols:
2,2-Bis (4-hydroxyphenyl)-propane,
2,2-bis-(3,5-dimethyl-4-hydroxyphenyl)-propane,
2,2-bis (3,5-dichloro-4-hydroxyphenyl) propane,
2,2-bis-(3,5-dibromo-4-hydroxyphenyl)-propane and
1,1-bis-(4-hydroxyphenyl)-cyclohexane.

The diphenols which are preferred for the preparation of the aromatic polycarbonates A generally correspond to the following formula:

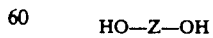

(I)

wherein Z denotes a divalent, mononuclear or polynuclear aromatic $C_6$-$C_{30}$-group to which the two OH groups are directly attached, each being attached to a carbon atom of an aromatic system.

Particularly preferred diphenols correspond to the following formula:

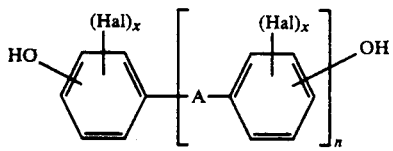

wherein

A denotes a single bond, $C_1$–$C_5$-alkylene, $C_2$–$C_5$-alkylidene, $C_5$–$C_6$-cycloalkylene or -alkylidene, —O—, —S—,

—$SO_2$— or

Hal denotes chlorine or bromine,
x stands for 0, 1 or 2 and
n stands for 0 or 1.

Also to be included among the aromatic polycarbonates A are block copolycarbonates containing from 1 to 20% by weight, preferably from 1.5 to 15 and especially from 2 to 10% by weight, based on the diphenol groups of the copolycarbonate A, of condensed residues of diphenols corresponding to the following formula:

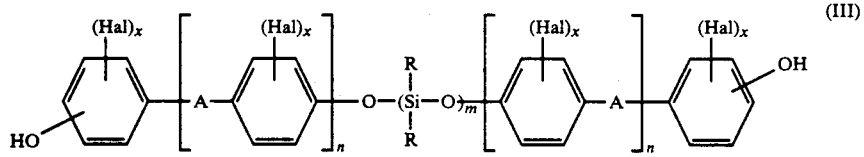

wherein

A, Hal, x and n have the meanings indicated above,
m stands for an integer with a value from 5 to 100, preferably from 20 to 80, and
R denotes $C_1$–$C_{20}$-alkyl, preferably methyl, ethyl, propyl, n-butyl or tert.-butyl, or $C_6$–$C_{20}$-aryl, preferably phenyl, and the substituents R may assume, independently of one another, any of the meanings within the definition of R not only in the above formula (III) but also on each silicon atom of the block copolycarbonate.

When the aromatic polycarbonates A are mixtures containing at least one block copolycarbonate based on a diphenol of formula (III), the proportion of condensed diphenol residues (III) should preferably amount to 1 to 20% by weight, based on the total quantity of all the diphenol residues of the aromatic polycarbonates A.

The preparation of block copolycarbonates based on diphenols of the formula (III) is described, for example, in DE-OS 33 34 872 and in US-PS 3 821 325.

The aromatic polycarbonates A may be branched by using small quantities, preferably from 0.05 to 2.0 mol-% (based on the diphenols used) of trifunctional or higher than trifunctional compounds, for example compounds containing three or more than three phenolic hydroxyl groups.

The aromatic polycarbonates A generally have an average molecular weight $M_w$ of from 10,000 to 200,000, preferably from 20,000 to 80,000, determined by light scattering.

The molecular weight $M_w$ of the polycarbonate A may be adjusted in known manner by means of the calculated quantities of chain terminating agents such as phenols, halogenated phenols or alkyl phenols.

Examples of particularly preferred chain terminating agents include phenol, p-chlorophenol, p-tert.-butylphenol and 2,4,6-tribromophenol as well as long chained alkylphenols such as 4-(1,3-tetramethylbutyl)-phenol according to DE-OS 2 842 005 or monoalkylphenols or dialkylphenols having a total of 8 to 20 carbon atoms in the alkyl substituents according to DE-OS 3 506 472, such as 3,5-di-tert.-butylphenol, p-iso-octylphenol, p-tert.-octylphenol, p-dodecylphenol, 2-(3,5-dimethylheptyl)-phenol and 4-(3,5-dimethyl-heptyl)-phenol.

The quantity of chain terminating agents to be used is generally from 0.5 to 10 mol-%, based on the sum of the diphenols used.

Particularly preferred aromatic polycarbonates A are not only the bisphenol.A homopolycarbonate but also copolycarbonates of bisphenol-A containing up to 15 mol-%, based on the total sum of diphenols, of 2,2-bis-(3,5-dibromo-4-hydroxyphenyl)-propane and the copolycarbonates of diphenols of formula (II) with 1 to 20% by weight of diphenols of the formula (III), based on the sum of diphenols (II) and (III), preferably with A=2,2-propylene.

Polyalkylene terephthalates B in the context of this invention are reaction products of aromatic dicarboxylic acids or reactive derivatives thereof (e.g. dimethyl esters or anhydrides) and aliphatic, cycloaliphatic or araliphatic diols and mixtures of these reaction products. They may be prepared by known methods (Kunststoff-Handbuch, Vol.VIII page 695 et seq, Carl Hanser Verlag, Munich 1973).

Preferred polyalkylene terephthalates B contain at least 80 mol-%, preferably not less than 90 mol-%, based on the dicarboxylic acid component, of terephthalic acid groups and at least 80 mol-%, preferably at least 90 mol-%, based on the diol component, of ethylene glycol In addition to terephthalic acid groups, the preferred polyalkylene terephthalates B may contain up to 20 mol-% of groups of other aromatic or cycloaliphatic dicarboxylic acids having 8 to 14 carbon atoms or aliphatic dicarboxylic acids having 4 to 12 carbon atoms, e.g. residues of phthalic acid, isophthalic acid, naphthalene-2,6-dicarboxylic acid, 4,4'-diphenyldicarboxylic acid or succinic, adipic, sebacic, azelaic or cyclohexane diacetic acid.

In addition to the ethylene glycol and butane-1,4-diol groups, the preferred polyalkylene terephthalates B may contain up to 20 mol-%, preferably up to 10 mol-% of other aliphatic diols containing 3 to 12 carbon atoms or cycloaliphatic diols containing 6 to 21 carbon atoms, e.g. residues of propane-1,3-diol, 2-ethylpropane-1,3-diol, neopentylglycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3- and -1,6-diol, 2-ethylhexane-1,3-diol, 2,2-diethylpropane-1,3-diol, hexane-2,5-diol, 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis-(4-hydroxypropoxyphenyl)-propane (DE-OS 24 07 647, 24 07 776 and 27 15 932).

The polyalkylene terephthalates B may be branched by the incorporation of relatively small quantities of trihydric or tetrahydric alcohols or tribasic or tetrabasic carboxylic acids as described e.g. in DE-OS 19 00 270 and US-PS 3 692 744. The following are examples of preferred branching agents: Trimesic acid, trimellitic acid, trimethylolethane, trimethylolpropane and pentaerythritol.

Particularly preferred polyalkylene terephthalates B are those which have been prepared entirely from terephthalic acid or its reactive derivatives (e.g. its dialkyl esters) and ethylene glycol and/or butane 1,4-diol and mixtures of these polyalkylene terephthalates.

The polyalkylene terephthalates preferably used as component B generally have an intrinsic viscosity of from 0.4 to 1.5 dl/g, preferably from 0.5 to 1.3 dl/g, especially from 0.6 to 1.2 dl/g, determined in each case in phenol/o-dichlorobenzene (1:1 parts by weight) at 25° C.

The graft polymers C include graft copolymers with rubbery elastic properties which are obtainable mainly from at least two of the following monomers: Chloroprene, butadiene-(1,3), isoprene, styrene, acrylonitrile, ethylene, propylene, vinyl acetate and (meth)acrylic acid esters containing 1 to 18 carbon atoms in the alcohol component: in other words, polymers of the type described, for example, in "Methoden der Organischen Chemie" (HoubenWeyl), Vol. 14/1, Georg Thieme Verlag, Stuttgart 1961, pages 393–406 and in C.B.Bucknall, "Toughened Plastics", Appl. Science Publishers, London 1977. The preferred polymers C are at least partially cross-linked and have gel contents above 20% by weight, preferably above 40% by weight and especially above 60% by weight.

The preferred graft polymers C include graft polymers of

C.1 from 5 to 90 parts by weight, preferably from 30 to 80 parts by weight of a mixture of C.1.1 from 50 to 95 parts by weight of styrene, $\alpha$-methylstyrene, styrenes substituted with halogen or methyl in the nucleus, methyl methacrylate or mixtures of these compounds and C.1.2 from 5 to 50 parts by weight of acrylonitrile, methacrylonitrile, methylmethacrylate, maleic acid anhydride, $C_1$-$C_4$-alkyl-substituted or phenyl-N-substituted maleimides or mixtures of these compounds on C.2 from 10 to 95 parts by weight, preferably from 20 to 70 parts by weight of a polymer having a glass transition temperature below $-10°$ C.

Examples of preferred graft polymers C include polybutadienes, butadiene/styrene copolymers and acrylate rubbers grafted with styrene and/or acrylonitrile and/or (meth)acrylic acid alkyl esters: i.e. copolymers of the type described in DE-OS 1 694 173 (=US-PS 3 564 077); and polybutadienes, butadiene/styrene copolymers and butadiene/acrylonitrile copolymers, polyisobutenes and polyisoprenes grafted with acrylic or methacrylic acid alkyl esters, vinyl acetate, acrylonitrile, styrene and/or alkylstyrenes, as described e.g. in DE-OS 2 348 377 (=US-PS 3 919 353).

Particularly preferred polymers C are, for example, the ABS polymers described e.g. in DE-OS 2 035 390 (=US-PS 3 644 574) or in DE-OS 2 248 242 (=GB-PS 1 409 275).

Particularly preferred graft polymers C are those graft polymers which are obtainable by a grafting reaction of I. from 10 to 70% by weight, preferably from 15 to 5 especially from 20 to 40% by weight, based on the graft product, of at least one (meth)acrylic acid ester or from 10 to 70% by weight, preferably from 15 to 50% by weight, especially from 20 to 40% by weight of a mixture of from 10 to 50% by weight, preferably from 20 to 35% by weight of acrylonitrile or (meth)acrylic acid ester, based on the mixture, and from 50 to 90% by weight, preferably from 65 to 80% by weight of styrene, based on the mixture, on II. from 30 to 90% by weight, preferably from 50 to 85 and especially from 60 to 80% by weight, based on the graft product, of a butadiene polymer containing at least 50% by weight, based on II, of butadiene groups as graft basis, the gel content of graft basis II preferably amounting to at least 70% by weight (determined in toluene), the degree of grafting G from 0.15 to 0.55 and the average particle diameter $d_{50}$ of the graft polymer C from 0.1 to 2 $\mu$m, preferably from 0.2 to 0.6 $\mu$m.

(Meth)acrylic acid esters I are esters of acrylic acid or methacrylic acid and monohydric alcohols containing 1 to 8 carbon atoms. The methyl, ethyl and propyl esters of methacrylic acid are particularly preferred.

The graft basis II may in addition to its butadiene groups contain up to 50% by weight, based on II, of residues of other ethylenically unsaturated monomers such as styrene, acrylonitrile, esters of acrylic or methacrylic acid having 1 to 4 carbon atoms in the alcohol component (such as methyl acrylate, ethyl acrylate, methyl methacrylate or ethyl methacrylate), vinyl esters and vinyl ethers. The preferred graft basis II is pure polybutadiene.

Since, as is known, the graft monomers are not necessarily completely grafted on the graft basis by the grafting reaction, the graft polymers C according to the present invention may also be products obtained by the polymerisation of the graft monomers in the presence of the graft basis.

The degree of grafting G denotes the ratio by weight of grafted graft monomer to graft basis and is dimensionless.

The average particle size $d_{50}$ is the diameter which is smaller than 50% by weight of the particles and larger than the other 50% by weight. It may be determined by ultracentrifuge measurements (W. Scholtan, H. Lange, Kolloid. Z. und Z. Polymere 250 (1972), 782–796).

Particularly preferred graft polymers C are also, for example, the graft polymers obtained from a) from 20 to 90% by weight, based on C, of a graft basis consisting of an acrylate rubber having a glass transition temperature below $-20°$ C. and b) from 10 to 80% by weight, based on C, of graft monomer consisting of one or more than one polymerisable ethylenically unsaturated monomer whose homopolymer or copolymer produced in the absence of (a) would have a glass The acrylate rubbers (a) of polymers C are preferably polymers of alkyl acrylates, optionally with up to 40% by weight, based on (a), of other polymerisable ethylenically unsaturated monomers. The preferred polymerisable acrylic acid esters include $C_1-C_8$-alkyl esters, for example, methyl, ethyl, n-butyl, n-octyl and 2-ethylhexyl esters: halogenated alkyl esters, preferably halogenated $_1-C_8$-alkyl esters such as chloroethyl acrylate: and mixtures of these monomers.

Monomers containing more than one polymerisable double bond may be copolymerised for the purpose of cross-linking. Preferred examples of cross-linking monomers include esters of unsaturated monocarboxylic acids containing 3 to 8 carbon atoms and unsaturated monohydric alcohols containing 3 to 12 carbon atoms or saturated polyols containing 2 to 4 OH groups and 2 to 20 carbon atoms, e.g. ethylene glycol dimethacrylate and allyl methacrylate; multiply unsaturated heterocyclic compounds such as trivinyl cyanurate and triallyl cyanurate: polyfunctional vinyl compounds such as divinyl and trivinyl benzenes: also triallyl phosphate and diallyl phthalate.

Allyl methacrylate, ethylene glycol dimethacrylate, diallyl phthalate and heterocyclic compounds containing at least three ethylenically unsaturated groups are preferred cross-linking monomers.

Particularly preferred cross-linking monomers are the cyclic monomers, triallyl cyanurate, triallyl isocyanurate, trivinyl cyanurate, triacryloyl hexahydro-s-triazine and triallyl benzenes.

The quantity of cross-linking monomers is preferably from 0.02 to 5% by weight, in particular from 0.05 to 2% by weight, based on graft basis (a).

When cyclic cross-linking monomers having at least three ethylenically unsaturated groups are used it is advantageous to limit the quantity to less than 1% by weight of the graft basis (a).

Preferred "other" polymerisable ethylenically unsaturated monomers optionally used in addition to the acrylic acid esters for the preparation of graft basis (a) include e.g. acrylonitrile, styrene, α-methylstyrene, acrylamides, vinyl-$C_1-C_6$-alkyl ethers, methyl methacrylate and butadiene. Emulsion polymers having a gel content of at least 60% by weight are preferred acrylate rubbers used as graft basis (a).

The gel content of the graft basis (a) is determined in dimethylformamide at 25° C. (M. Hoffmann, H. Kramer, R. Kuhn, Polymeranalytik I and II, Georg Thieme Verlag, Stuttgart (1977).

The aqueous dispersions of graft polymer C to be used for the preferred embodiment of mutual precipitation with fluorinated polyolefine D generally have solids contents of from 25 to 60% by weight, preferably from 30 to 45% by weight.

The fluorinated polyolefines D are high molecular weight compounds and have glass transition temperatures above $-30°$ C., generally above 100° C., fluorine contents of from 59 to 76% by weight, preferably from 65 to 76 and especially from 70 to 76% by weight, and average particle diameters $d_{50}$ of from 0.05 to 1000 μm, preferably from 0.08 to 20 μm. Preferred fluorinated polyolefines D include polytetrafluoroethylene, polyvinylidene fluoride, tetrafluoroethylene/hexafluoropropylene copolymers and ethylene/tetrafluoroethylene copolymers. Fluorinated polyolefines are known (see, "Vinyl and Related Polymers" by Schildknecht, John Wiley and Sons. Inc., New York, 962, pages 484–494: "Fluoropolymers" by Wall, WileyInterscience John Wiley and Sons, Inc., New York, Volume 3, 1970, pages 623–654; "Modern Plastics Encyclopaedia", 970–1971, Volume 47, No. 10 A, Oct. 1970, McGraw-Hill, Inc., New York, pages 134 and 774: "Modern Plastics Encyclopaedia", 1975–1976, Oct. 1975, Volume 52, No. 10 A McGraw-Hill, Inc. New York, pages 27, 28 and 472, and US-PS 3 671 487, 3 723 373 and 3 838 092). They have densities from 1.2 to 2.3 g/cm$^3$, preferably from 1.2 to 1.9 g/cm$^3$, and preferably have melting points above 300° C.

Preferred dispersions of fluorinated polyolefines D have solids contents of from 30 to 70% by weight, in particular from 50 to 60% by weight. The mixtures of dispersions of the graft polymer C and the fluorinated polyolefine D may be worked up in the usual manner, e.g. spray drying or freeze drying, preferably at temperby atures from 20–150° C., especially from 50–100° C.

Drying may be carried out at 50 to 200° C., preferably at 70 to 150° C.

The ratio by weight of graft polymer C to fluorinated polyolefine D in the mutually precipitated product is preferably from 95:5 to 60:40.

When mutually precipitated components C/D are used, the quantity of C+D is preferably from 0.15 to 4% by weight, based on the sum of A+B.

The phosphorus compounds E are well known: see e.g. Ullmann's Encylopädie der technischen Chemie, 4th Edition, Volume 18, page 301 f, Verlag Chemie, Weinheim 1979.

Preferred substituents $R^1$ to $R^3$ include, for example, methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl.

The following are examples of preferred phosphorus compounds E: Tributylphosphate, tris-(2-chloroethyl)-phosphate, tris-(2,3-dibromopropyl)-phosphate, triphenylphosphate, tricresylphosphate, diphenylcresylphosphate, diphenyloctylphosphate, diphenyl-2-ethylcresylphosphate, tri-(isopropylphenyl)-phosphate. halogen-substituted arylphosphates, methylphosphonic acid dimethyl ester, methylphosphonic acid diphenyl ester, phenylphosphonic acid diethyl ester, triethylphosphine oxide and tricresylphosphine oxide.

The moulding compounds according to the invention may contain conventional additives such as slip agents and mould release agents, nucleating agents. antistatic agents, stabilizers, fillers and reinforcing materials, flame retardants and dyes and pigments.

The filled or reinforced moulding compounds may contain up to 60% by weight, preferably from 10 to 60% by weight, based on the filled or reinforced moulding compound, of fillers and/or reinforcing materials. Glass fibres are preferred reinforcing materials. Preferred fillers which may also act as reinforcing materials include glass balls, mica, silicates, quartz, talc, titanium dioxide and wollastonite.

The flame-retardants are preferably halogen compounds from the series of chlorine and bromine compounds. They are generally used in quantities of up to 15% by weight, based on the flame resistant moulding compound. It is particularly preferred to use quantities of flame retardant corresponding to a halogen content in the flame retardant of from 3 to 10% by weight, based on the flame-resistant moulding compound.

Suitable flame retardants in principle include all chlorinated or brominated compounds which are not volatile under the conditions of preparation and processing of the moulding compounds according to the invention, i.e. at temperatures from 200 to 330° C., nor tend to decompose at these temperatures. This means that they must not split off halogen under the above-mentioned conditions so that their flame retarding action will be preserved in the event of fire.

Examples of preferred flame-retardants include decabromodiphenylether, octabromodiphenyl, octabromodiphenylether and tribromotetrachlorotoluene; also oligomeric bromine compounds such as oligocarbonates based on tetrabromobisphenol-A, and high molecular weight bromine compounds, e.g. high molecular weight polycarbonates based on tetrabromobisphenol-A or polyphenylene oxides which are brominated in the nucleus.

The desired halogen content may also be introduced by way of the polycarbonate A.

The flame-retardants may contain heavy metal compounds such as antimony trioxide as synergistic agents; see e.g. DE-OS 22 55 654, 23 10 742, 26 15 071, 26 22 414, 30 00 660, 30 02 985 and 33 22 260, EP-A 63 031 and US-PS 3 936 400, 4 280 005 and 4 344 878.

The moulding compounds according to the invention are highly flame-resistant even without conventional metal synergists and even suffer no significant loss in quality when prepared without any flame-retardants containing chlorine or bromine if this is necessary for preventing the formation of corrosive gases of combustion.

The moulding compounds according to the invention may be prepared by mixing the components at elevated temperatures, preferably in the region of 200 to 330° C. and may therefore be prepared, for example, by melt compounding or melt extruding in conventional apparatus such as internal kneaders, extruders or double shaft screws. The components may be introduced into the mixing apparatus either simultaneously or successively.

The present invention thus also relates to a process for the preparation of the moulding compounds according to the invention by mixing the components at elevated temperatures.

The moulding compounds according to the invention may be used for the production of moulded articles of all types, e.g. by injection moulding. Examples of moulded articles are: Housing parts for electronic calculators and electrical apparatus, cover plates or access panels for the building industry, and parts of motor vehicles.

Moulded articles may also be produced by deep drawing previously produced plates or films.

The invention therefore also relates to the use of the moulding compounds for the production of moulded articles.

The percentages given in the following Examples refer to weight and parts are parts by weight.

EXAMPLES

Components used:
A1.
Straight chained polycarbonate based on bisphenol-A having a relative solution viscosity of 1.26–1.28 determined in $CH_2Cl_2$ at 25° C. and at a concentration of 0.5 g/100 ml.
A2.
Copolycarbonate based on 90% by weight of bisphenol-A and 10% by weight of tetrabromobisphenol-A having a relative solution viscosity of 1.284 determined in $CH_2Cl_2$ at 25° C. and at a concentration of 0.5 g/l; bromine content: about 5% by weight, based on A2.

B.
Polybutylene terephthalate having an intrinsic viscosity (I.V.) of 1.2 dl/g (determined as a 5% solution in phenol/o-dichlorobenzene (1:1 parts by weight) at 25° C.).

C.
Graft polymer of 50% by weight of a styrene/acrylonitrile mixture (in proportions by weight of 72:28) on 50% of a particulate polybutadiene having an average particle size $d_{50}$ of 0.4 μm and obtained by emulsion polymerisation (solids content: 34% by weight).

D.
Tetrafluoroethylene polymer ((R)Teflon 30 N of DuPont) C+D (coprecipitation)

A 60% by weight aqueous emulsion of tetrafluoroethylene polymer D (particle diameter from 0.05 to 0.5 μm) was mixed with the emulsion of graft polymer C and stabilized with 1.8% by weight, based on the polymer solids content, of phenolic antioxidants. The mixture was coagulated at 85 to 95° C. with an aqueous solution of $MgSO_4$ (Epsom salt) and acetic acid at pH 4–5, filtered and washed until virtually free from electrolytes. The mixture was then freed from the major quantity of water by centrifuging and dried to a powder at 100° C. The resulting mixture contained 10% of tetrafluoroethylene polymer, based on C+D.

E. Triphenylphosphate

The components were mixed in a 3-1 internal kneader at temperatures from 200 to 220° C.

The moulded articles were produced in an injection moulding apparatus at 260° C.

The fire characteristics of the samples was determined according to UL-Subj. 94 V on samples with thicknesses of 1.6 mm and 3.2 mm. The UL 94 V test is carried out as follows:

Samples of substance are made up into rods measuring 127×12.7×1.6 mm or 127×12.7×3.2 mm. The rods are mounted vertically with the underside of the sample placed 305 mm above a strip of bandaging material. Each sample rod is ignited individually by means of two successive ignitions each 10 seconds in duration. The fire characteristics are observed after each ignition procedure and the sample is then assessed. A Bunsen burner having a blue flame of natural gas 10 mm (⅜ inch) in height with a calorific content of $3.73 \times 10^4$ $kJ/m^3$ (1,000 BTU per cubic foot) was used for igniting the samples. The UL 94 V-O classification covers the properties of materials described below, which were tested according to the UL 94 Regulation. The materials in this class contain no samples which burn for longer than 10 seconds after each exposure to the test flame. They have no total burning time of more than 50 seconds for each set of samples exposed twice to the flame. They contain no samples which burn completely right up to the clamp fixed to the top end of the sample. They contain no samples which ignite the wad of material underneath them by burning droplets or particles. They also contain no samples which continue to glow for longer than 30 seconds after removal of the test flame.

Other UL 94 classifications cover samples which have a longer after-burning time (Classification V-1) or which in addition give off burning droplets or particles which ignite the wadding underneath the sample (Classification V-2). The classification "n.B." means that the samples have not withstood the test and have an after-burning time of >30 s.

Determination of the notched impact strength was carried out according to DIN 53 453/ISO R 179 on standard small rods measuring 50×6×4 mm which had a V-shaped notch 2.7 mm in depth.

The dimensional stability under heat according to Vicat (Method B) was determined according to DIN 53 460.

To determine the strength of the joint lines, the impact strength according to DIN 53 452 (Charpy method) was measured on the joint line of samples measuring 170×10×4 mm which had been extruded from both sides.

TABLE

Composition and properties of the moulding compounds

| | Components | | | | | | UL 94 V | | Notched Impact Strength | Dimensional stability under heat | Strength of joint line |
|---|---|---|---|---|---|---|---|---|---|---|---|
| | A1 | A2 | B | E | C+D | C | SAN* | | | | |
| | (parts by weight) | | | | | | 3.2 mm | 1.6 mm | (kJ/m²) | (°C.) | (kJ/m²) |
| Examples | | | | | | | | | | | |
| 1 | 80 | | 20 | 10 | 2 | | | V0 | V0 | 8.8 | 95 | 78.1 |
| 2 | 60 | | 40 | 10 | 2 | | | V0 | V2 | 7.5 | 92 | 69.7 |
| 3 | | 80 | 20 | 5 | 2 | | | V0 | V0 | 10.0 | 116 | 62.6 |
| 4 | | 80 | 20 | 5 | 2 | | | V0 | V0 | 7.9 | 100 | 56.9 |
| 5 | | 60 | 40 | 5 | 2 | | | V1 | V1 | 10.5 | 116 | 64.1 |
| 6 | | 60 | 40 | 10 | 2 | | | V0 | V0 | 6.5 | 97 | 56.9 |
| Comparison Examples | | | | | | | | | | | | |
| 7 | 80 | | 20 | | | | | n.b.(1) | n.b.(1) | 11.9 | 127 | 10.4 |
| 8 | | 80 | 20 | | | | | V2 | V2 | 15.7 | 138 | 12.3 |
| 9 | | 75 | | 10 | 2 | | 25 | V0 | V0 | — | 103 | 3.0 |
| 10 | | 75 | | 10 | 2 | 10 | 25 | V0 | V0 | — | 100 | 4.0 |

*Styrene/acrylonitrile copolymer (ratio by weight 72:28) having an intrinsic viscosity of 0.55 dl/g determined in dimethylformamide at 20° C.
(1)Test not passed The following results may be derived from the above Table:

The moulding compounds according to the invention are distinguished by their advantageous combination of high joint line strength, good notched impact strength and high dimensional stability under heat and flame-resistance.

Comparison Examples 7 and 8 show the level of properties of pure polycarbonate/polyester mixtures without additives.

Highly flame-resistant moulding compounds may also be prepared without chlorinated or brominated compounds (Examples 1 and 2).

Examples 9 and 10 show that flame-resistant compositions in which component B is replaced by SAN (and optionally graft polymer C) have a distinctly lower joint line strength than the Examples according to the invention.

We claim:

1. Thermoplastic moulding compounds of
A. from 45 to 95% by weight of aromatic polycarbonate,
B. from 5 to 55% by weight of polyalkylene terephthalate,
C. from 0.1 to 30% by weight of graft polymer,
D. from 0.05 to 5% by weight of fluorinated polyolefine and
E. from 1 to 20% by weight of phosphorus compound corresponding to the formula

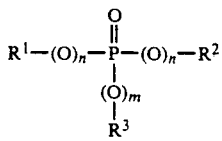

wherein
$R^1$, $R^2$ and $R^3$ denote, independently of one another, optionally halogenated $C_1$-$C_8$-alkyl or optionally halogenated $C_6$-$C_{20}$-aryl,
m denotes 0 or 1 and
n denotes 0 or 1,
the above percentages referring in each case to the sum of components A + B,
wherein said aromatic polycarbonate is based on a diphenol having no alkyl substituents on the phenyl group other than the bond between the phenyl groups.

2. Moulding compounds according to claim 1 containing from 60 to 90% by weight of component A and from 10 to 40% by weight of component B, based in each case on the sum of components A+B.

3. Moulding compounds according to claim 1 containing from 0.1 to 12% by weight of component C, based on the sum of components A+B.

4. Moulding compounds according to claim 1 containing from 0.1 to 3% by weight of component C, based on the sum of components A+B.

5. Moulding compounds according to claim 1 containing from 0.1 to 1% by weight of component D, based on the sum of components A+B.

6. Moulding compounds according to claim 1 containing from 0.1 to 0.5% by weight of component D, based on the sum of components A+B.

7. Moulding compounds according to claim 1, containing from 2 to 15% by weight of component E, based on the sum of components A+B.

8. Moulding compounds according to claim 1 in which component C is present as a mixture with components D which has been obtained by mixing aqueous dispersions of the two components followed by mutual precipitation, component D having a particle size of from 0.05 to 20 μm and a density of from 1.2 to 1.9 g/cm³.

9. Process for the preparation of the moulding compounds according to claim 1 by mixing the components at elevated temperature.

10. Use of the moulding compounds according to claim 1 for the production of moulded articles.

* * * * *